(No Model.)
P. C. BROWN.
COMBINED SINK SHOVEL AND CLEANER.
No. 401,126. Patented Apr. 9, 1889.
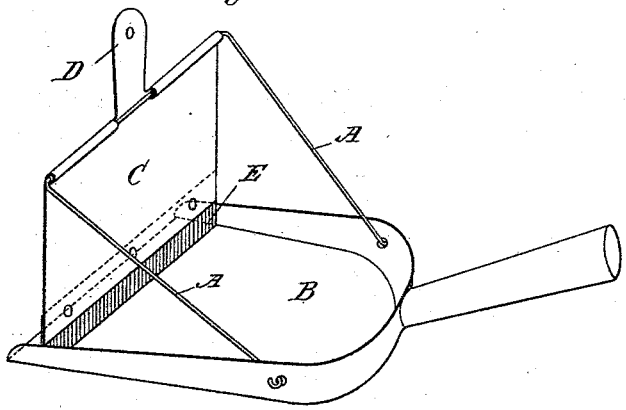
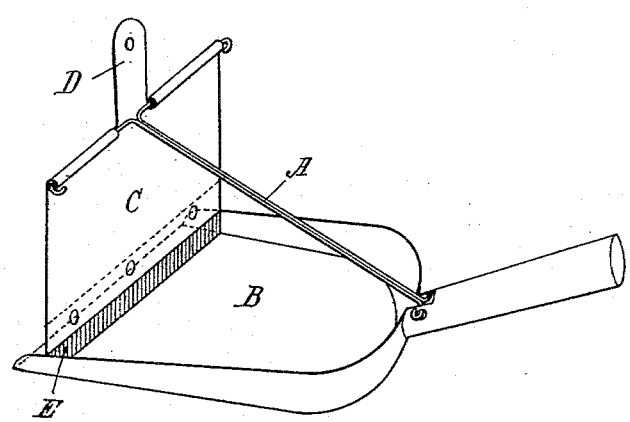
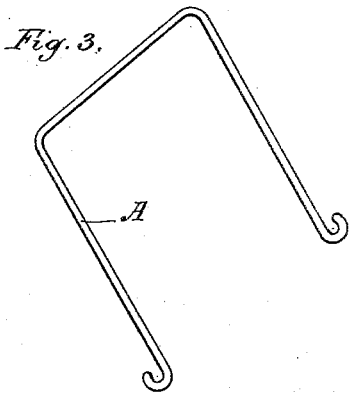
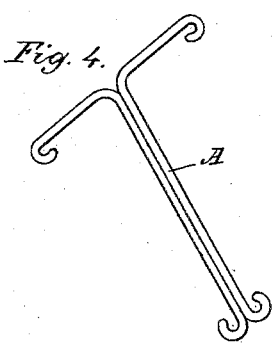
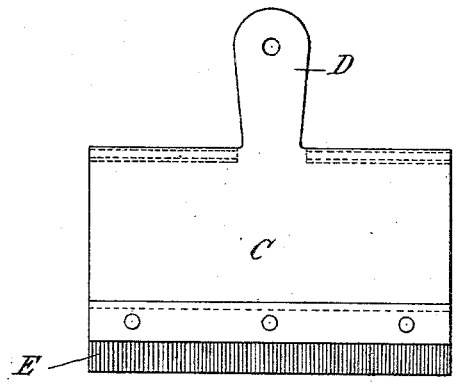
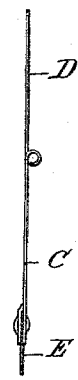
WITNESSES:
Horsley Barker
Robert Pritchard
INVENTOR
Philip Charles Brown
BY M. V. Tierney
ATTORNEY

UNITED STATES PATENT OFFICE.

PHILIP CHARLES BROWN, OF BROOKLYN, NEW YORK.

COMBINED SINK SHOVEL AND CLEANER.

SPECIFICATION forming part of Letters Patent No. 401,126, dated April 9, 1889.

Application filed May 18, 1888. Serial No. 274,337. (No model.)

*To all whom it may concern:*

Be it known that I, PHILIP CHARLES BROWN, residing in Brooklyn, county of Kings, State of New York, have invented certain new and useful Improvements in Sink-Shovels (or Scoops,) combined with a Cleaner (or Brush;) and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a shovel (or scoop) provided with my improvement, a movable cleaner (or brush) attached thereto by two movable shanks. Fig. 2, also a perspective view, shows the shovel (or scoop) with cleaner (or brush) connected by a single movable shank; Fig. 3, a detailed view of the double movable shanks which connect the cleaner (or brush) to the shovel (or scoop;) Fig. 4, a view in detail of the single movable shank which is used to attach the cleaner (or brush) to the shovel (or scoop;) Fig. 5, a view in detail of the movable cleaner (or brush.) Fig. 6 is an end view of the movable cleaner (or brush.)

Similar letters of reference indicate corresponding parts in all the figures.

My invention has relation to shovels (or scoops) used for cleaning sinks, combined with a cleaner (or brush;) and it consists in the improved method of combining a shovel (or scoop) and cleaner (or brush) in one, and in the improved construction of said shovel (or scoop) and a cleaner (or brush,) combined as hereinafter more fully described and claimed.

In the accompanying drawings, the letter A indicates the movable shank or shanks, which may be of metal or wood, or any suitable material. Said shanks may be straight, bent, or curved, and may be in one or more pieces.

B indicates the shovel (or scoop.)
C indicates the cleaner (or brush.)
D shows thumb-piece on cleaner (or brush.)
E shows the sweeper attached to the cleaner (or brush.)

This combined shovel (or scoop) and cleaner (or brush) is made as follows: A shovel (or scoop) of any required size has attached to it by a movable shank or shanks a cleaner (or brush.) Said movable shank or shanks may be connected with the shovel (or scoop) at the sides or handle thereof, as may be desired. If the shovel (or scoop) is of ordinary size, then double movable shanks are preferable; if smaller, a single movable shank will answer. The movable cleaner (or brush) is made of suitable size to fit the shovel (or scoop,) and may be made of any suitable material. The cleaner (or brush) is movable at its connection with the movable shank or shanks which connect it with shovel (or scoop.)

To the handle of the cleaner (or brush) is affixed or forming part thereof a thumb-piece. This movable cleaner (or brush) can be extended outward from the shovel (or scoop,) or turned inward or raised or lowered by means of the movable shank or shanks which connect it with the shovel (or scoop,) and also by reason of its being movable at its connection with the movable shank or shanks.

I therefore claim—

1. The combination, with a shovel (or scoop,) of arms hinged to the rear part of the flange thereof and allowed a vertical swinging movement, and a cleaner pivoted on the outer ends of said arms above the shovel and adapted to swing thereon, substantially as described.

2. The combination, with a shovel (or scoop,) of arms, as A, hinged to the rear sides of the shovel and united at their outer ends, a cleaner, as C, pivoted to the connecting-piece of said arms, and a thumb-piece, as D, and scraper, as E, secured on the upper and lower edges, respectively, of said cleaner, substantially as described.

PHILIP CHARLES BROWN.

Witnesses:
ROBERT PRITCHARD,
HORSLEY BARKER.